Aug. 31, 1926.
C. H. COX
VACUUM SNUBBER
Filed Nov. 3, 1924
1,597,768
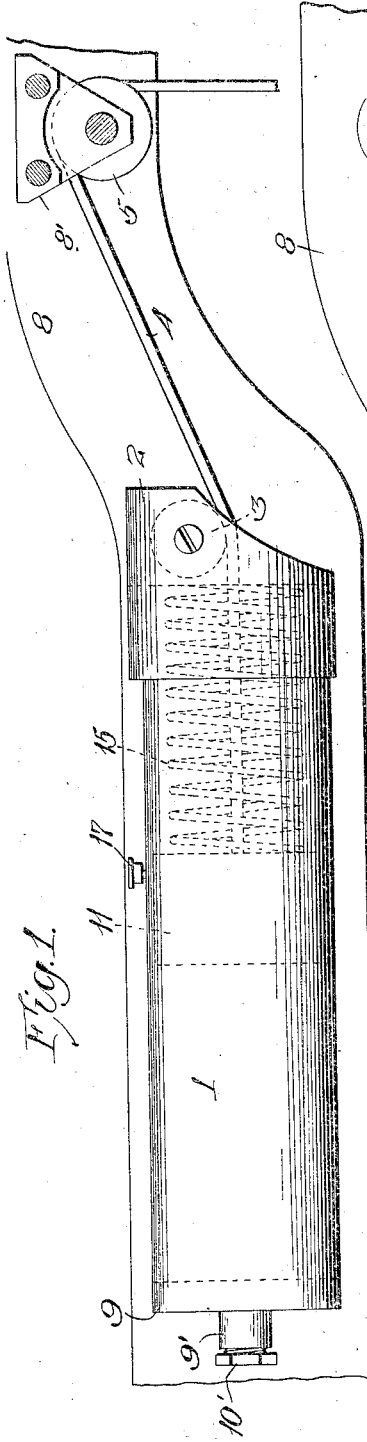
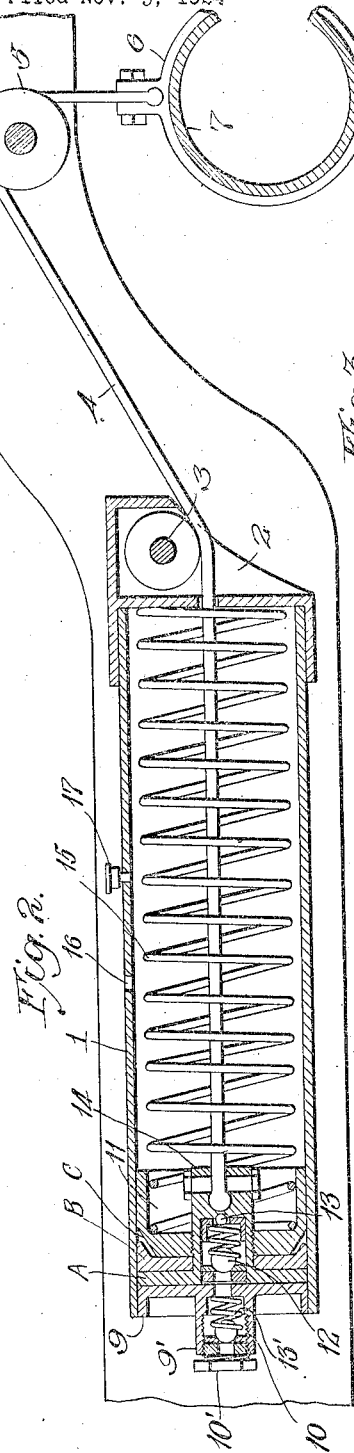
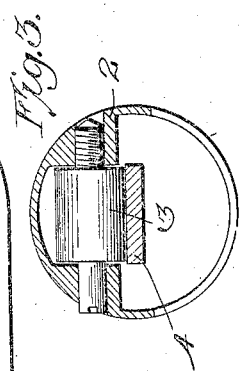
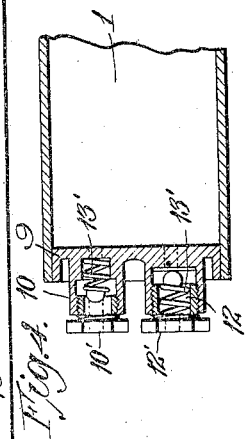
Inventor
Charles H. Cox Patented Aug. 31, 1926.

1,597,768

UNITED STATES PATENT OFFICE.

CHARLES H. COX, OF LOS ANGELES, CALIFORNIA.

VACUUM SNUBBER.

Application filed November 3, 1924. Serial No. 747,519.

This invention relates to a vacuum snubber (a resisting device) to retard the violent recoil of vehicle springs (especially when the vehicle is being driven over rough roads, and subjected to jolts, jars and body rebounds) when anchored to the body portion of a vehicle and attached to the axle portion thereof—or in such other place, places or manner as may be preferred for the purpose of snubbing the violent recoil effects of vehicle springs.

One of the principal objects of the invention is to construct a vacuum snubbing device so that it may be regulated to create a mechanical vacuum, a variable partial vacuum, and to annul the vacuum created, automatically, by means of inlet and outlet control valves and an air inlet aperture; to be simple, efficient in operation, durable in construction, manufactured at a relatively low cost, and which can be readily installed with a minimum amount of labor.

Another object, which especially forms the subject-matter of the invention, is the arrangement of the acting parts of the device, in order that the greatest energy afforded by the device will be available and applied, approximately when the vehicle springs are flexed to their approximate limit (by road inequalities or otherwise) thus retarding the prospective violence of the spring recoil in its approximate inception, which in turn will obviate any tendency to lessen the traction of the vehicle wheels and allow the body portion to seek its approximate normal position without undue violence; all of which will necessarily redound to the comfort of the occupants and the welfare and longevity of the vehicle.

A further object of the invention is to utilize the movable parts of the device relative to the stationary parts thereof, to govern the return movement of the plunger in approximate conformity with the action of the vehicle body and springs thereof.

Other objects may hereinafter appear.

I attain these objects by the mechanism illustrated in the accompanying drawings, in which:

Figure 1 is a fragmentary side view of an automobile chassis, with the snubber prospectively anchored thereto and attached, via belt 4, to axis 7; showing one form and arrangement of the snubber embodying the invention, also the vehicle chassis and axle thereof, the dotted lines on casing 1 indicating the position of the plunger and coil spring 15 when the chassis portion and axle thereof are at approximate normalcy.

Fig. 2 is a side view in cross section showing the position of chassis 8, casing 1, plunger 11, with belt 4, attached thereto relative to the position of axle 7, when the springs are flexed to their approximate limit and the chassis correspondingly low.

Fig. 3 is an end view, partially in cross section, showing the arrangement of pulley 3 and belt 4 in relation to casing 1; and Fig. 4 being a sectional side view showing particularly another form and arrangement of the valve system 10 and 10' and 12 and 12'.

Referring to Figs. 1 to 4, inclusive:

The snubber consists of a metallic tubular casing 1, having a head piece 2, suitably constructed to accommodate roller 3, and threaded to casing 1. 4 is a belt attached at one end to axle 7 and to plunger 11 on the other end. 5 is a pulley used for the purpose of changing the horizontal alignment of belt 4 to a vertical alignment; 6 is a metallic band encircling axle 7 and connected to belt 4. 8 is a fragmentary part of a vehicle chassis, to which casing 1 may be anchored; 8' is a bracket connected to chassis 8 to support pulley 5. 9 is an end piece, threaded into casing 1 and may have as an integral part thereof provision, 9', to accommodate valve 10; 10' being the threaded adjustable part of valve 10. 11 is a plunger consisting of three parts principally, and designated as A, B and C, respectively, slidably mounted in casing 1. A is the metallic base of plunger 11 and may be provisioned as shown in Fig. 2, with an integral extension for the accommodation of check-valve 12, and also form an anchorage for belt 4.

B is a cupped disk, preferably of leather, or any suitable material having the efficiency to form a vacuum when brought into action by the upward movement of chassis 8, relative to the axle portion thereof, via belt 4. C is a cup-formed metallic piece, threaded to the extension of base piece A, to retain the alignment of plunger 11 relative to casing 1, while said plunger 11 is in action. 13 is the air outlet of valve 12. 14 is the anchorage of belt 4. 15 is a coil spring to facilitate the back action of plunger 11. 16 is an air inlet aperture for the purpose of annulling the vacuum or partial vacuum created after plunger 11 passes said inlet in its outward movement. 17 is an oil cup to lubricate plunger 11.

The words "vacuum space", in dotted lines on casing 1, Fig. 1, indicate approximately where the vacuum will occur during the movement of plunger 11 from its position as shown in Fig. 2, to its approximate position as shown by dotted lines on casing 1, in Fig. 1.

In Fig. 4, 1 is a segment of casing 1. 9 is the end piece. 10 is an inlet check-valve and 10' is the valve regulator. 12 is the outlet valve and 12' the valve regulator. 10' and 12' are adjustable threaded plugs, having valve seats as a part thereof and air passages therein, for the purpose of adjusting valve spring 13'.

Referring to the action of the body portion and axle portion thereof, when the vehicle is in motion and subjected to violent spring recoil action: Fig. 1 indicates the approximate normal position of the chassis relative to the axle portion thereof; with the snubber prospectively anchored to chassis 8 and attached, via belt 4, to axle 7. The dotted lines on casing 1, in Fig. 1, indicate the position of plunger 11, coil spring 15 and belt 4 attached to axle 7 during said normalcy.

Visualize—the rapid action and extreme flex of the vehicle spring as a result of the vehicle wheels dropping suddenly into a road rut, and a corresponding downward movement of the body portion of the vehicle, said movement being accompanied by a corresponding movement of belt 4 and plunger 11, in casing 1, owing principally to the released tension of coil spring 15. The plunger 11 in its movement from the position shown in Fig. 1, by dotted lines on casing 1, to the position shown in Fig. 2, necessarily forces such air as might be in "vacuum space" (admitted via valve 10 or later by aperture 16) through valve 12, via outlet 13. Fig. 2 illustrates the position of plunger 11 when the vehicle spring is flexed approximately to its limit.

Further visualize—the violent prospective recoil of the vehicle spring accompanied by the prospective upward throw of the body, including the occupants thereof, also the immediate action of the snubber creating a vacuum, as a result of the upward throw of the body, and the outward movement of the plunger, thereby snubbing the prospective violence of the spring recoil in its inception.

Said plunger action, by creating a vacuum, allows valve 10 to open, thereby partially or wholly annulling said vacuum (by virtue of the law of gravity or atmospheric pressure relative to a vacuum), said vacuum or partial vacuum being entirely annulled, if plunger 11 passes air-inlet 16, thus allowing chassis 8 to seek approximate normalcy in a normal manner. Plus, the compression of coil spring 15, any violent prospective reaction of said spring will be retarded as a result of forcing the air out of "vacuum space" through valve 12 via outlet 13.

The mechanism prevents any violent rebounds of the body portion of the vehicle, since the several elements or devices composing the complete structure adjust themselves automatically and without jar or undue friction to the changed conditions incident to the use of the device in connection with vehicle chassis, axles and springs thereof.

Such modifications in the structure and application of the device as come within the scope of the appended claims are considered a part of this invention.

What I consider as new and desire to secure by Letters Patent, is:—

1. A vacuum snubber comprising a cylinder having an air inlet aperture therein to annul a vacuum; an air check valve system to facilitate the functioning and energy exerted by said vacuum when in action; a piston slidably mounted within said cylinder and opposed by a coil spring, a flexible belt connection between said piston and the axle portion of a vehicle, and means to facilitate the action and protection of said belt.

2. A vacuum creating device consisting of a cylinder having an air inlet provision to annul a vacuum, an adjustable valve system to control said vacuum, a piston slidably mounted within said cylinder, a spring opposing said piston, and a flexible belt connection between said piston and the axle portion of a vehicle.

3. In combination with a vehicle body and axle portion thereof, a vacuum snubber comprising a cylinder with an air inlet aperture therein to annul a vacuum, an intake and outlet valve attached to the end of said cylinder, a piston slidably mounted within said cylinder having a flexible belt attached thereto, said belt being connected with the axle portion of a vehicle, a coil spring mounted within said cylinder and opposing said piston, and a head piece having a roller attached thereto.

4. A vacuum creating device consisting of a cylinder adaptable to anchorage, said cylinder having an air inlet aperture therein and means for lubrication thereof; inlet and outlet valves attached thereto and a provision to accommodate a belt pulley, a coil spring opposing a piston which is slidably mounted within said cylinder and a belt connecting said piston with the axle portion of a vehicle.

5. A vacuum creating device consisting of a cylinder adaptable to anchorage, said cylinder having an air inlet aperture therein; inlet and outlet valves attached thereto; a piston slidably mounted within said cylinder; and means for the attachment of said piston to the axle portion of a vehicle.

CHARLES H. COX.